Feb. 9, 1932.                G. HILGER                1,844,161
                MULTIPLE PRESSURE REFRIGERATION SYSTEM
                Filed May 7, 1927        2 Sheets-Sheet 1
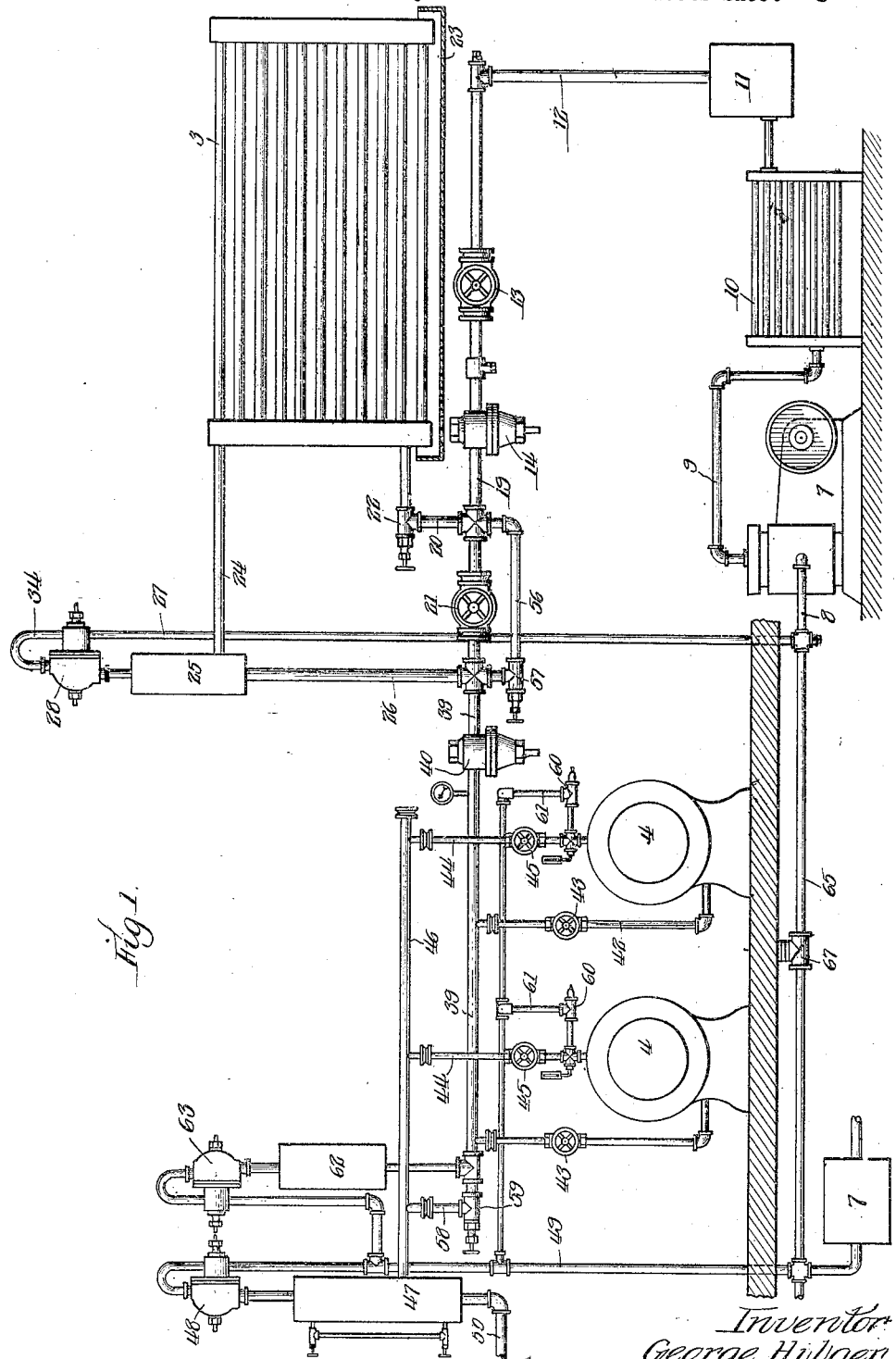
Inventor
George Hilger, Feb. 9, 1932. G. HILGER 1,844,161
MULTIPLE PRESSURE REFRIGERATION SYSTEM
Filed May 7, 1927 2 Sheets-Sheet 2
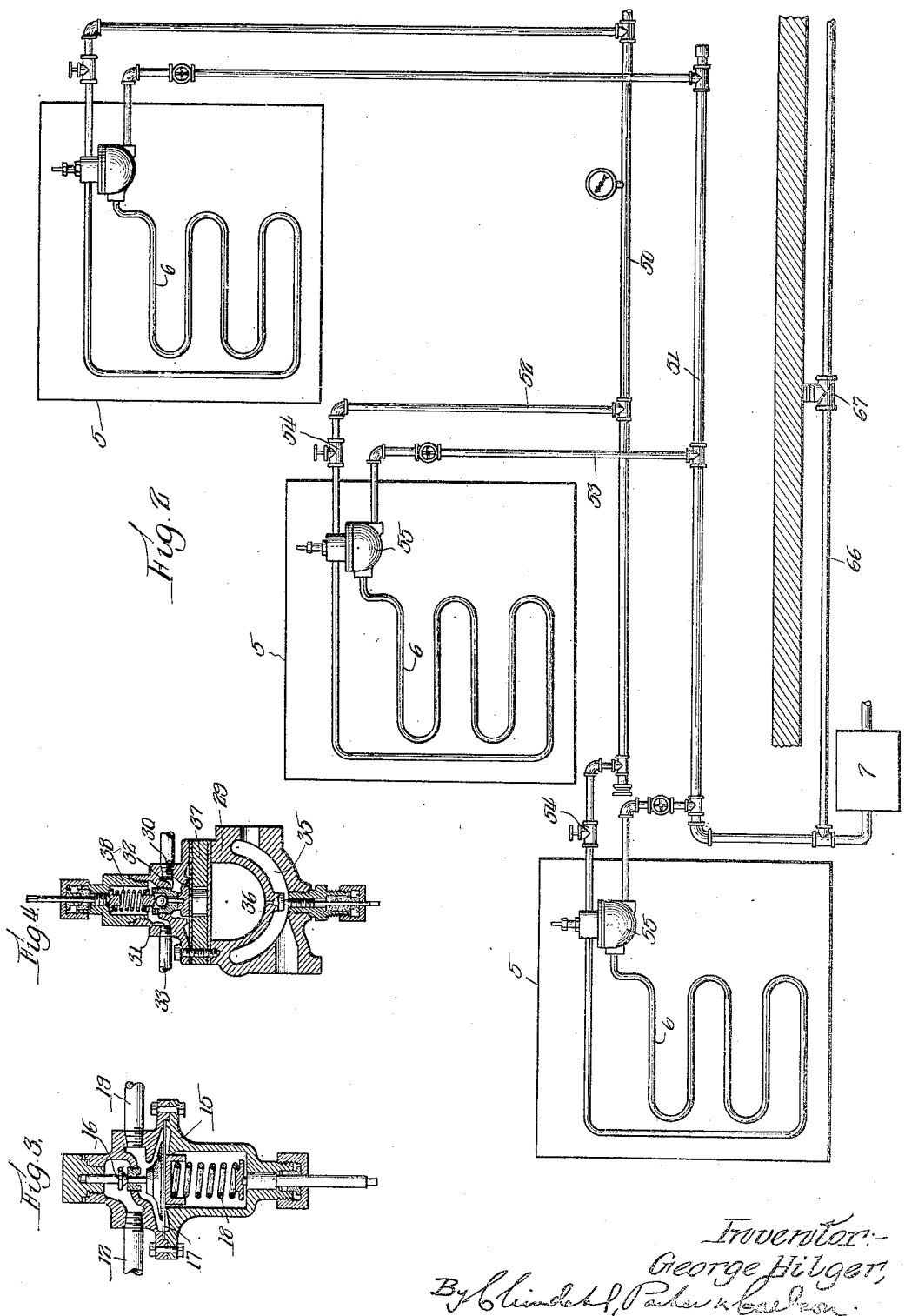

Patented Feb. 9, 1932

1,844,161

UNITED STATES PATENT OFFICE

GEORGE HILGER, OF CHICAGO, ILLINOIS

MULTIPLE PRESSURE REFRIGERATION SYSTEM

Application filed May 7, 1927. Serial No. 189,610.

This invention is directed to improvements in automatic refrigeration systems and more particularly to the automatic control of a refrigeration system in which the refrigerant is expanded in a plurality of steps or stages.

The primary object of the invention is to provide a new and improved system for and method of controlling the refrigeration of a plurality of evaporating elements so as to maintain maximum operating efficiency of the system as a whole even though the operating characteristics of the elements differ widely.

In my Patent No. 1,601,445, dated September 28, 1926, I have shown a refrigeration system in which the refrigerant liquefied by a compressor and condenser unit is expanded to an intermediate pressure which is maintained constant automatically so that the further expansion of the refrigerant into an evaporating element to be refrigerated can be accurately controlled by an automatic regulating means such as a thermo-responsive control valve.

Another object of the present invention is to provide in a multiple pressure refrigeration system of the type disclosed in my said patent, means whereby a refrigerant expanded to a constant pressure is utilized to maintain a refrigerating element at a constant temperature corresponding to the boiling point of the refrigerant at the reduced pressure.

A further object is to provide a refrigeration system having a plurality of refrigerating elements connected in series with means for maintaining certain of the elements flooded with liquid refrigerant by diverting from the main feed line of the system the gaseous component of the refrigerant formed by vaporization of the liquid in the preceding elements of the system.

A general object is to provide a refrigeration system for a plurality of evaporating elements which has a wide range of flexibility of operation in that the individual refrigerating elements can be cut out or cut in service as desired and which permits of accurate and automatic temperature control throughout the system.

Other objects and advantages of the invention will become apparent from the following detailed description taken in connection wth the accompanying drawings, in which Figure 1 is a schematic view of a part of a refrigeration system embodying the features of the present invention.

Fig. 2 is a similar view of the remaining porton of the system, the system as a whole being shown when Fig. 2 is placed to the left of Fig. 1.

Figs. 3 and 4 are sectional views of control valves used in the system.

While I have shown in the drawings and will herein describe the preferred embodiment of the invention, it is to be understood that I do not intend to be limited thereby to the particular form disclosed but aim to cover all modifications and alternative constructions falling within the spirit and scope of the invention as expressed in the appended claims.

The present invention is particularly adapted for use in the automatic control of a plurality of refrigerating elements having different or variable operating requirements such, for example, as the temperature to be maintained and the quantity of refrigeration to be effected. Such non-uniform conditions are encountered, for example, in a plant for making ice cream. Accordingly, the present invention will be described with reference to the refrigeration of various evaporating elements in such a plant. For this illustration therefore, let the system be considered as having one evaporating element such as a coil 3 for cooling the milk or other liquid ingredients to be used, a pair of freezers 4 and three rooms 5, the latter to be used for hardening the product formed in the freezers.

In the preparation of ice cream, it is desirable that the ingredients be cooled to a predetermined constant temperature before freezing and that the freezing be effected at a predetermined lower temperature. Therefore it is essential that the cooling coil 3 be maintained at a fixed temperature and supplied with refrigerant in such quantities as to be capable of cooling all of the milk or other ingredients passing over the coil. The freezers, which in practice are operated somewhat spasmodically, must also be adapted to cool a variable quantity of material to a constant temperature somewhat lower than that of the cooling coil 3. In hardening the ice cream formed in the freezers, it is desirable to maintain a fixed temperature in the room as a whole which is considerably lower than the temperature in the freezers. It will be seen, therefore, that since the ingredients used come in intimate contact with the coils 3 and the freezer coils, a fixed temperature must be maintained in these elements regardless of the quantity of ingredients to be cooled, while the temperature of the coils 6 for the hardening rooms may be varied considerably in order to maintain the temperature of the room.

Generally stated, the present invention when applied to a system such as above outlined, is carried out by connecting the coil 3, the freezers 4 and the coils 6 in series relation with one or more refrigeration units capable of supplying a quantity of liquid refrigerant equal to or in excess of the maximum demand of all of the evaporating elements which may be operating at any given time. In operation of the system herein illustrated, the liquid refrigerant from a source of supply is first expanded to a constant pressure corresponding to the temperature at which the coil 3 is to be maintained and is fed to the coil where a portion of the refrigerant evaporates to cool the ingredients flowing over the coil. The refrigerant thus vaporized is diverted or removed from the main feed line after passing the coil 3 and the excess of liquid refrigerant is expanded to a second constant pressure for use in the freezers 4, this pressure corresponding to the temperature to be maintained in the freezers. In a similar way the gaseous refrigerant spent or vaporized in the freezers to maintain the temperature thereof is then diverted from the feed line, and the remaining liquid is expanded into the coils of the hardening rooms. The flow of refrigerant to the coils 6 is controlled in response to the temperature changes in the several rooms and therefore is supplied only in quantities such as the coils are capable of evaporating in order to maintain the desired room temperatures. The refrigerant gasified in the coils 6 and also the gaseous refrigerant previously diverted from the main feed line is returned to the compressor units of the system for repetition of the refrigeration cycle.

Any suitable source of liquid refrigerant may be provided, the one illustrated herein being of the ordinary compression type having a compressor 7 supplied with spent or gaseous refrigerant from a return line 8 and adapted to deliver the refrigerant under pressure to a discharge line 9 leading to a condenser 10 wherein the refrigerant is liquefied by cooling. The liquid is allowed to collect in a storage reservoir or receiver 11 which is connected to a main feed header 12 having a hand operated valve 13 therein for controlling the flow of liquid to an expansion valve 14. The latter valve functions automatically to expand the refrigerant from the condenser pressure to a reduced substantially constant pressure such that the boiling point of the refrigerant at that pressure will be substantially equal to the temperature at which the coil 3 is to be maintained. Any preferred valve capable of such operation may be employed, the one shown in Fig. 3 being operable under the control of the discharge side of the valve. It comprises briefly a casing 15 having in its upper portion a passageway controlled by the valve member 16. A coiled expansion spring 18 enclosed in the lower portion of the casing acts to maintain a predetermined pressure on the diaphragm to counterbalance the pressure exerted by the refrigerant on the discharge side of the valve. By adjusting the spring, the pressure on the discharge side of the valve and therefore the boiling point of the refrigerant may be readily varied.

Upon expansion of the refrigerant in passing by the valve 14 a portion thereof is vaporized owing to the decrease in the boiling point of the liquid, the latent heat for such evaporation being derived from the sensible heat of the remaining liquid so that the temperature of the refrigerant as a whole is reduced to its boiling point at the reduced pressure. Under these conditions, the major portion of the refrigerant in the feed header 19 will be in a liquid state and is supplied in that state to the coil 3.

When the coil 3 is connected for normal operation, all of the refrigerant for all of the refrigerating coils flows from the valve 14 through the pipe 19 and pipe 20, a hand valve 21 being closed and shut-off valve 22 for the coil being open. In the coil 3, a portion of the liquid refrigerant is vaporized in order to cool the liquid ingredients passing over the coil into the catch pan 23, the amount of evaporation which takes place in the coil being proportional to the quantity of liquid ingredients flowing over the coil. From the coil the refrigerant passes through an outlet pipe 24 into a receptacle 25 where the gaseous component of the refrigerant separates from the liquid component by gravity, the liquid being permitted to flow down through a pipe 26 to the succeeding refrigerating coils while the gaseous component collects in the upper portion of the receptacle from which it is removed automatically.

The receptacle communicates at its upper end with a suction line 27 leading to the return line 8 of the compressor 7 through a control valve 28, capable of diverting from the main feed line into the suction line the gaseous component of the refrigerant which was formed by evaporation of liquid in the coil 3. In the present instance, the valve 28 is opened and closed automatically under the control of the refrigerant tending to pass out of the upper end of the receptacle 25. To this end, a valve of the type disclosed and claimed in my Patent No. 1,601,444 may be employed. Preferably this valve (Fig. 4) comprises a casing 29 having an inlet 30 and an outlet 31 in its upper portion forming a passageway which is controlled by a valve member 32. In the lower portion of the casing there is a jacket chamber 35 having inlet and outlet openings surrounding a thermostatic chamber 36 which is closed by an insulating diaphragm 37 connected to the valve member 32. In applying the valve to the present system, the suction line 27 is connected with the valve outlet 31 while the inlet 30 communicates with the outlet of the jacket chamber 35 by means of a pipe 34. The inlet to the chamber 35 communicates directly with the receptacle 25. The chamber 36 is filled with a quantity of ammonia or other gas which expands and contracts readily with temperature variations in the jacket chamber whereby to actuate the valve member. The valve may be set by adjustment of a spring 38 so that it will be opened when the temperature in the chamber 35 exceeds a predetermined point and closed when the gas flowing through the chamber is below that temperature.

Preferably the valve is set to open when the temperature in the chamber 35 is slightly above the boiling point of the refrigerant at the pressure in the cooling coil 3. When this temperature is exceeded, as would be the case when a quantity of spent gas has accumulated in the receptacle 25, the valve will be opened and the gas will be allowed to pass out of the receptacle into the suction line 27. Then when the gas passing through the chamber 35 decreases in temperature below the predetermined point the valve will close automatically and this condition will exist when substantially all of the warmer gas has escaped.

With the thermostatic valve connected as above described, it will be observed that a well-defined separation of the spent or superheated gas from the saturated gas and the liquid refrigerant may be effected. Thus, it will be noted, that the pressure on the upper surface of the diaphragm of the valve is the same as that existing in the receptacle 25. This being constant because the pressure in the coil 3 is constant, the valve member can only be effected by the thermostatic element acting on the other side of the diaphragm. By controlling the escape of the gaseous refrigerant into the suction line by its temperature rather than by a float or other means, any gaseous refrigerant super-saturated by the presence of suspended mist or particles of refrigerant at the boiling point temperature may be prevented from escaping. In other words, the valve may be set so that it will pass only dry gaseous refrigerant.

The excess of liquid refrigerant flows from the pipe 26 into a pipe 39 and then is further expanded by an automatic constant pressure reducing valve 40 to a pressure at which the boiling point temperature of the refrigerant is substantially equal to the fixed temperature at which the freezers 4 are to be maintained. The valve 40 operates in the same way as the valve 14, being controlled by the pressure in the discharge end of the pipe 39 to which the freezers are connected in parallel relation by intake pipes 42, each having a hand-controlled valve 43 therein. In passing through the valve 40 a portion of the liquid refrigerant is gasified, the heat absorbed thereby serving to maintain the major portion of the refrigerant liquefied at the reduced pressure, both liquid and gas passing into the freezers. A portion of the liquid is evaporated in the freezers depending on the refrigerating requirements at the time. The refrigerant leaving each of the freezers passes through an outlet pipe 44 having a valve 45 therein into a pipe 46. The latter pipe leads to a receptacle 47 for separating the gas and liquid components of the refrigerant, this being accomplished automatically by a valve 48 of the same construction and connected to a suction line 49 in the same way as the valve 28. This valve controls the flow of unsaturated refrigerant to its suction line and is set to respond to a temperature which is slightly above the boiling point of the refrigerant at the pressure maintained in the freezers. Thus the gaseous component of the refrigerant is diverted automatically into suction line 49 while the liquid component flows into a header 50 which is the main feed line for the coils 6 of the hardening rooms.

The coils 6 are connected in parallel relation between the feed header 50 and a suction header 51 by intake pipes 52 and outlet pipes 53, the former having hand operated valves 54 therein for cutting out the hardening rooms from the system as desired. Means is provided for regulating the flow of refrigerant to the respective coils 6 to the maximum which each coil is capable of evaporating in order to maintain a predetermined constant temperature in its hardening room. In the present instance, valves 55 constructed like the valves 28 and 48 are employed with the inlet and outlet openings of the main valve passageway connected respectively to the pipe 52 and the coil 6. The inlet and outlet openings of the jacket chamber 35 of these valves are connected respectively with the outlet of the coil 6 and the pipe 53 leading to the suction header. When thus connected to the feed line, each valve 55 serves as an expansion valve and preferably is set so as to admit only such quantities of refrigerant as the coil controlled thereby is capable of evaporating at such reduced pressure. Thus, when the temperature in the hardening room controlled by one of the valves rises above the desired point, which condition is indicated by an increased temperature of the gas in the return line from the coil, the valve will be opened to admit more refrigerant for evaporation. Then, when the room is cooled to the proper point, as indicated by a lower temperature of the outgoing gaseous refrigerant, the thermostatic unit of the valve will operate to close the valve. In this way the room temperature is maintained constant although the temperature of the cooling coil for the room may vary widely.

With the arrangement above described, it will be apparent that expansion of the refrigerant at the condenser pressure takes place in three successive steps or stages and that the refrigerant at the constant pressure effected by the first two stages of expansion is utilized to maintain constant temperatures in the coil 3 and the freezers 4, respectively. Further, it will be noted that those portions of the system which are to operate at constant pressures are maintained in flooded condition when all of the evaporating elements are in operation, that is to say, the coil 3 and the freezers are supplied with liquid refrigerant in quantities considerably in excess of that required to meet refrigerating requirements under maximum demand conditions in the coils. Thus the requirements of the constant pressure evaporating elements of the system are always satisfied, this being controlled by the automatic valves 14 and 40. By removing the gaseous refrigerant at each stage of the expansion after practically its entire refrigerating effect, that is, its capacity to absorb latent heat as distinguished from sensible heat, has been utilized by its evaporation, the efficiency of the system as a whole is maintained at maximum. In other words, even though the coils are connected in series, all of the refrigerant supplied by the compresser units does not pass through each of the coils. For this reason, smaller size valves and piping may be used in the latter stages of the system in order to handle the relatively small volume of liquid refrigerant. If the refrigerant gasified in the coil 3 were allowed to remain in the main feed line so as to pass through the freezers and the coils 6, the efficiency of the latter coils would be materially decreased owing to the fact that only a small proportion of the inner coil surfaces would be in contact with the liquid refrigerant therein. Thus larger coil areas would be required than with the present arrangement in order to evaporate the same quantities of liquid. Furthermore, additional power would be required to move the used or spent gas through the system.

Other features of the present system are its extremely flexible character and its ability to operate entirely automatically. Thus, any desired number of similar evaporating elements may be connected in parallel at the various stages of expansion and the number of stages may be multiplied as desired to meet various operation requirements. When thus connected any one or more of the evaporating elements may be taken out of service without effecting the automatic operation of those remaining in service. To illustrate this feature, let it be assumed that the hardening rooms and the freezers are out of service while the coil 3 is operating. Under such conditions no refrigerant would flow through the pipe 26 because the freezers and the coils 6 are drawing none. Therefore, the expansion valve 14 would expand only such quantities of refrigerant as is required by the coil 3, the refrigerant vaporized in the coil being discharged intermittently into the suction line 27, as above described. Then when the freezers are brought into service, the quantity of refrigerant flowing into the coil 3 in order to maintain the fixed constant pressure therein would exceed the requirements of the coil and equal the requirements of both the coil and the freezers.

To further increase the flexibility of operation in the system, means is provided for compensating automatically for abnormal demands by the evaporating elements operating at the lower pressure or when the gas diverting control valves are so burdened as to prevent instantaneous flow of liquid refrigerant to the succeeding portion of the system. This is accomplished in the present instance by by-passing the coil 3 under the control of a predetermined pressure differential between the pipes 19 and 39. For this purpose, a pipe 56 is connected between the pipes 19 and 39 of the main feed line and provided with a pressure-relief valve 57 of well known construction which is adapted to be opened automatically when the pressure in the pipe 39 decreases to a predetermined point below that in the pipe 19. Such a condition might arise, for example, when all of the evaporating elements in the system are started in operation at substantially the same time and at full load capacity. In such a case, the flow of liquid refrigerant to the freezers might be delayed considerably owing to the extraordinary demand of the coil 3. But this difficulty is effectually avoided by the provision for by-passing the coil 3. A similar by-pass around the freezers 4 is provided by a pipe 58 having an automatic pressure-relief valve 59 therein set to respond to a predetermined pressure differential between the pipes 39 and 50.

When the coil 3 is not in use the liquid refrigerant may be passed directly to the expansion valve 40 by opening the valve 21 and closing the valve 22. In a similar way either or both of the freezers may be cut out of service by manipulating the valves 43 and 45 in the inlet and outlet lines of the freezers.

The freezers can be cleaned with hot water or steam without creating excessive pressures therein by opening the valves 45 during each cleaning. In the event that an excessive pressure is accidentally developed as by failure to properly manipulate the control valves therefor, such pressure will be relieved by a safety valve 60 in a pipe 61 connecting the freezer outlet with the suction line 49.

Ordinarily the hardening rooms of the ice cream plant operate continuously so that part of the time the coils 6 will be the only evaporating elements in operation. Under these conditions, it becomes desirable to remove the gaseous component of the refrigerant resulting from the expansion effected in the valves 14 and 40. To this end, a liquid receptacle 62 is connected to the feed line by a pipe 39 and is provided with an automatic valve 63 which operates in the same way as the valve 48 to permit the passage of gaseous refrigerant only into the suction line 49. The liquid component of the refrigerant at this point is allowed to flow through a pressure relief valve 64 when the coils 6 draw sufficient refrigerant to cause a predetermined pressure differential to exist between the line 39 and the header 50.

The suction lines 27, 49 and 51 for the different evaporating elements may be connected to independently operable compressors 7, two of which are shown herein diagrammatically. When the entire system is in operation, all of the compressors would be used to maintain the desired suction pressure at the various points and to supply compressed refrigerant to the main feed line. In order to equalize the burden on the different compressor units as the different elements of the system are thrown into and out of service or as the demands thereof change during operation, the suction lines 27 and 49 may be connected by a header 65 and lines 49 and 51 by a header 66. In each of these headers there is provided a check valve 67 for controlling the connection of any one suction line with the compressors corresponding to the other suction lines. This valve is of well known construction and operates automatically to open itself when the pressure differential between its inlet and outlet exceeds a predetermined point.

To illustrate, let it be assumed that the hardening rooms are drawing an abnormal amount of refrigerant while the freezers are out of operation. Under such conditions, the valve 67 in the header 66 would open so that two compressors for the suction lines 49 and 51 would operate to maintain the proper pressure in the suction line 51. In this way the burden on the different compressor units is effectually equalized, the compressed refrigerant in each case being supplied to the main feed header 12.

I claim as my invention:

1. A refrigeration system having, in combination, a feed line, a source of liquid refrigerant under pressure including a compressor and a condenser, a pair of evaporating coils connected in series in said feed line between said condenser and the suction side of said compressor, an automatic valve in said feed line between said condenser and the first of said coils, said valve being operable to expand the refrigerant to be supplied to said coil to a reduced substantially constant pressure, valve means located on the outlet side of said coil and adapted to remove from said feed line the gaseous component of the refrigerant leaving said coil, and a valve in said feed line for controlling the flow of liquid refrigerant to said second coil.

2. A refrigeration system having, in combination, a feed line, a source of liquid refrigerant under pressure including a compressor and a condenser, a pair of evaporating coils connected in series in said feed line between said condenser and the suction side of said compressor, an automatic valve in said feed line between said condenser and the first of said coils, said valve being operable to expand the refrigerant to be supplied to said coil to a reduced substantially constant pressure, valve means located on the outlet side of said coil and adapted to remove from said feed line the gaseous component of the refrigerant leaving said first mentioned coil, a valve in said feed line for controlling the flow of liquid refrigerant to said second coil, and thermostatic means for controlling the opening and closing of said last mentioned valve.

3. A refrigeration system having, in combination, a feed line with a compression unit providing a source of liquid refrigerant, a refrigerating coil connected to the discharge side of said unit, an automatic expansion valve operable to maintain a reduced substantially constant pressure in said coil, two branch lines each connecting said coil to the suction side of said compression unit, means operable automatically to separate the gaseous and liquid components of the refrigerant leaving said coil and to direct the liquid component thus separated into one of said branch lines and the gaseous component into said other branch line, a second refrigerating coil interposed in said liquid line, and means operating automatically to regulate the flow of refrigerant to said second coil.

4. A refrigeration system having, in combination, a feed line, means providing a source of liquid refrigerant under pressure, an automatic valve operable to expand said liquid to a reduced substantially constant pressure, a coil supplied with refrigerant at the reduced pressure, a reservoir connected to the outlet side of said coil and adapted to separate the liquid and gaseous components of the refrigerant leaving said coil, an automatically operable valve permitting the flow of gaseous component from said reservoir, a second coil connected so as to be supplied with liquid refrigerant collecting in said reservoir, and means controlling the flow of liquid refrigerant to said second coil.

5. A refrigeration system having, in combination, a feed line, means providing a source of liquid refrigerant for said feed line, a refrigerating coil in said feed line, a valve communicating with said source of supply and operable automatically to maintain a constant pressure in said coil, automatic means associated with the outlet side of said coil for diverting from the feed line the gaseous component of the refrigerant leaving the coil, a second refrigerating coil adapted to be supplied with the liquid refrigerant passing said first mentioned coil, and an automatic valve responsive to a predetermined pressure in said feed line between said coils for by-passing the first mentioned coil.

6. A refrigeration system having, in combination, a feed line, a source of liquid refrigerant connected thereto, a plurality of evaporating elements connected in said feed line in series relation, and means responsive to the temperature of the gaseous refrigerant evaporated in one of said elements for effecting the removal of said gaseous refrigerant from said feed line while permitting the flow of the remaining liquid refrigerant to another of said elements.

7. A refrigeration system having, in combination, a source of liquid refrigerant under pressure, a feed line connected to said source of supply, an expansion valve in said feed line operable automatically to expand the liquid refrigerant to a reduced substantially constant pressure, a refrigerating coil connected in said feed line so as to be supplied with refrigerant at the constant pressure and thereby to be maintained at a constant temperature corresponding to said pressure, and means connected to said feed line on the outlet side of said coil and adapted when in operation to draw liquid refrigerant into said coil in quantities exceeding the evaporating capacity of the coil at the constant pressure maintained therein.

8. A refrigeration system having, in combination, a compression unit providing a source of liquid refrigerant under pressure, a refrigerating coil having its inlet adapted for communication with said source of supply and its outlet adapted for communication with the suction side of said compression unit, an expansion valve interposed between said coil and said source of supply and operable automatically to maintain a reduced substantially constant pressure in said coil, a valve controlling the flow of refrigerant from said coil to the suction side of said unit, and thermostatic means responsive to a temperature slightly in excess of the boiling point of the refrigerant at the pressure within said coil for opening and closing said valve whereby to permit the passage of gaseous refrigerant only from said coil into said suction line.

9. A refrigeration system having, in combination, means providing a source of liquid refrigerant under pressure, a refrigerating coil adapted for connection with said source of supply, an expansion valve operable automatically to supply refrigerant to said coil at a constant pressure, means including a reservoir for receiving the liquid and gaseous components of the refrigerant passing through said coil, and a temperature controlled valve operable to permit the flow of the gaseous component of the refrigerant out of said reservoir.

10. A refrigeration system having, in combination, a feed line supplied with liquid refrigerant under pressure, a plurality of refrigerating elements connected in series relation in said feed line, a plurality of suction lines each associated with the outlet side of one of said elements, individual valves controlling the flow of refrigerant from each coil to its suction line, a plurality of compressor units each associated with one of said suction lines, and valve controlled means operatively associated with each of said suction lines and operable automatically to equalize the burden on the several compressor units.

11. A refrigeration system having, in combination with a source of liquid refrigerant under pressure, a valve operable automatically to expand said refrigerant to a reduced substantially constant pressure, an evaporating coil adapted to be supplied with refrigerant at said reduced pressure, a second evaporating coil connected in series with said first mentioned coil, a valve responsive to the temperature of the refrigerant leaving said first mentioned coil for removing the gaseous refrigerant evaporated in that coil, and a thermostatically controlled valve operable to control the flow of liquid refrigerant to said second coil.

12. In a system for refrigerating two coils, one of which is to be maintained at a constant temperature, the method of operation which consists in supplying refrigerant to said first coil at a constant pressure corresponding to the temperature at which said coil is to be maintained, removing the gaseous refrigerant evaporated in said first mentioned coil, and supplying the remaining liquid refrigerant to the second coil.

13. In a system for refrigerating two coils, one of which is to be maintained at a constant temperature and the other of which is to maintain a constant temperature in a cooling compartment, the method of operation which consists in supplying refrigerant to said first coil at a constant pressure corresponding to the temperature at which said coil is to be maintained, removing the gaseous refrigerant evaporated in said first mentioned coil, and regulating the flow of the remaining liquid refrigerant to said second coil according to the maximum which said coil is capable of evaporating in order to maintain the predetermined temperature in said cooling compartment.

14. In a refrigeration system having a plurality of evaporating elements connected in series relation and intended to be maintained at successively decreasing temperatures, the method of operation which consists in expanding liquid refrigerant in successive stages to substantially constant pressures for evaporation in the respective elements, supplying the refrigerant to each of said elements at the pressure corresponding to the temperature at which that element is to be maintained, and removing from the outlet side of each of said elements the portion of the refrigerant vaporized in that element.

15. In a system having two evaporating coils, one to be maintained at a constant temperature and the other to maintain a predetermined temperature in a cooling compartment, the method of operation which consists in supplying liquid refrigerant to said first coil at a pressure corresponding to the temperature at which the coil is to be maintained and in quantities in excess of the maximum demand requirements of said coil, separating the liquid and gaseous component of the refrigerant passing through said coil and supplying said liquid component to said second coil in quantities equal to the maximum which the second coil is capable of evaporating in order to maintain the temperature of said cooling compartment.

In testimony whereof, I have hereunto affixed my signature.

GEORGE HILGER.